US012810548B2

(12) United States Patent
Cowburn et al.

(10) Patent No.: US 12,810,548 B2
(45) Date of Patent: Nov. 24, 2026

(54) LOCATION BASED AUGMENTED-REALITY SYSTEM

(71) Applicant: Snap Inc., Santa Monica, CA (US)

(72) Inventors: Piers George Cowburn, London (GB); David Li, London (GB); Isac Andreas Müller Sandvik, London (GB); Qi Pan, London (GB)

(73) Assignee: Snap Inc., Santa Monica, CA (US)

( * ) Notice: Subject to any disclaimer, the term of this patent is extended or adjusted under 35 U.S.C. 154(b) by 206 days.

(21) Appl. No.: 18/764,665

(22) Filed: Jul. 5, 2024

(65) Prior Publication Data

US 2024/0362863 A1 Oct. 31, 2024

Related U.S. Application Data

(63) Continuation of application No. 17/744,445, filed on May 13, 2022, now Pat. No. 12,062,134, which is a continuation of application No. 16/818,540, filed on Mar. 13, 2020, now Pat. No. 11,335,060.

(60) Provisional application No. 62/829,571, filed on Apr. 4, 2019.

(51) Int. Cl.

| | |
|---|---|
| ***G06T 17/00*** | (2006.01) |
| ***G06T 17/05*** | (2011.01) |
| ***H04L 51/046*** | (2022.01) |
| ***H04L 67/306*** | (2022.01) |
| ***H04W 4/02*** | (2018.01) |

(52) U.S. Cl.

CPC ............ *G06T 17/05* (2013.01); *H04L 51/046* (2013.01); *H04L 67/306* (2013.01); *H04W 4/023* (2013.01)

(58) Field of Classification Search

None

See application file for complete search history.

(56) References Cited

U.S. PATENT DOCUMENTS

| | | | |
|---|---|---|---|
| 8,436,860 | B1 | 5/2013 | Milliron et al. |
| 9,443,280 | B2 | 9/2016 | Hu et al. |
| 9,848,215 | B1 | 12/2017 | Gordon |
| 10,334,221 | B2 | 6/2019 | Reiss et al. |
| 10,387,730 | B1 | 8/2019 | Cowburn et al. |
| 10,549,198 | B1 | 2/2020 | Zhang |
| 10,654,942 | B2 | 5/2020 | Resnick et al. |
| 11,335,060 | B2 | 5/2022 | Cowburn et al. |
| 2004/0036717 | A1 | 2/2004 | Kjeldsen et al. |
| 2010/0299431 | A1 | 11/2010 | Vanderhook et al. |
| 2011/0055189 | A1 | 3/2011 | Effrat et al. |

(Continued)

FOREIGN PATENT DOCUMENTS

| | | | |
|---|---|---|---|
| CN | 113966525 | A | 1/2022 |
| KR | 20140007427 | A | 1/2014 |

(Continued)

OTHER PUBLICATIONS

"U.S. Appl. No. 16/818,540, Final Office Action mailed Oct. 22, 2021", 7 pgs.

(Continued)

*Primary Examiner* — Martin Mushambo

(74) *Attorney, Agent, or Firm* — Schwegman Lundberg & Woessner, P.A.

(57) ABSTRACT

A location-based augmented-reality system to generate and cause display of augmented-reality content that includes three-dimensional typography, based on a perspective, and location of a client device.

20 Claims, 10 Drawing Sheets

(56) References Cited

U.S. PATENT DOCUMENTS

| | | | |
|---|---|---|---|
| 2011/0208805 | A1 | 8/2011 | Kasetty et al. |
| 2011/0279445 | A1* | 11/2011 | Murphy .............. G06F 3/04842 715/764 |
| 2012/0310602 | A1 | 12/2012 | Jacobi et al. |
| 2013/0083003 | A1 | 4/2013 | Perez et al. |
| 2013/0127849 | A1 | 5/2013 | Marketsmueller et al. |
| 2013/0281206 | A1 | 10/2013 | Lyons et al. |
| 2013/0290116 | A1 | 10/2013 | Hepworth et al. |
| 2014/0007427 | A1 | 1/2014 | Petermann et al. |
| 2014/0152577 | A1 | 6/2014 | Yuen et al. |
| 2015/0002419 | A1 | 1/2015 | White et al. |
| 2016/0314130 | A1 | 10/2016 | Cox |
| 2016/0378722 | A1 | 12/2016 | Emmons et al. |
| 2017/0162197 | A1 | 6/2017 | Cohen |
| 2018/0101776 | A1 | 4/2018 | Osotio et al. |
| 2018/0120892 | A1 | 5/2018 | Von Badinski et al. |
| 2018/0182162 | A1 | 6/2018 | Tsai et al. |
| 2018/0252835 | A1 | 9/2018 | Deng |
| 2018/0253900 | A1 | 9/2018 | Finding et al. |
| 2019/0089757 | A1 | 3/2019 | Sorensen et al. |
| 2019/0279069 | A1 | 9/2019 | Bastide et al. |
| 2019/0318729 | A1 | 10/2019 | Chao et al. |
| 2019/0325067 | A1 | 10/2019 | Vaughn et al. |
| 2019/0387097 | A1 | 12/2019 | Li et al. |
| 2020/0302126 | A1 | 9/2020 | Malcangio et al. |
| 2020/0320782 | A1 | 10/2020 | Cowburn et al. |
| 2022/0343596 | A1 | 10/2022 | Cowburn et al. |

FOREIGN PATENT DOCUMENTS

| | | | |
|---|---|---|---|
| KR | 102548919 | B1 | 6/2023 |
| WO | WO-2020205227 | A1 | 10/2020 |

OTHER PUBLICATIONS

"U.S. Appl. No. 16/818,540, Non Final Office Action mailed Mar. 18, 2021", 9 pgs.
"U.S. Appl. No. 16/818,540, Non Final Office Action mailed Jul. 20, 2021", 13 pgs.
"U.S. Appl. No. 16/818,540, Notice of Allowance mailed Jan. 14, 2022", 7 pgs.
"U.S. Appl. No. 16/818,540, Response filed Apr. 29, 2021 to Non Final Office Action mailed Mar. 18, 2021", 12 pgs.
"U.S. Appl. No. 16/818,540, Response filed Aug. 10, 2021 to Non Final Office Action mailed Jul. 20, 2021", 11 pgs.
"U.S. Appl. No. 16/818,540, Response filed Nov. 19, 2021 to Final Office Action mailed Oct. 22, 2021", 10 pgs.
"U.S. Appl. No. 17/744,445, Final Office Action mailed Sep. 28, 2023", 11 pgs.
"U.S. Appl. No. 17/744,445, Non Final Office Action mailed Jun. 23, 2023", 10 pgs.
"U.S. Appl. No. 17/744,445, Non Final Office Action mailed Dec. 7, 2023", 8 pgs.
"U.S. Appl. No. 17/744,445, Notice of Allowance mailed Apr. 5, 2024", 7 pgs.
"U.S. Appl. No. 17/744,445, Preliminary Amendment filed Jul. 20, 2022", 7 pgs.
"U.S. Appl. No. 17/744,445, Response filed Mar. 6, 2024 to Non Final Office Action mailed Dec. 7, 2023", 8 pgs.
"U.S. Appl. No. 17/744,445, Response filed Jul. 26, 2023 to Non Final Office Action mailed Jun. 23, 2023", 9 pgs.
"U.S. Appl. No. 17/744,445, Response filed Nov. 28, 2023 to Final Office Action mailed Sep. 28, 2023", 10 pgs.
"International Application Serial No. PCT/US2020/023132, International Preliminary Report on Patentability mailed Oct. 14, 2021", 9 pgs.
"International Application Serial No. PCT/US2020/023132, International Search Report mailed Jun. 25, 2020", 3 pgs.
"International Application Serial No. PCT/US2020/023132, Written Opinion mailed Jun. 25, 2020", 7 pgs.
"Korean Application Serial No. 10-2021-7035612, Notice of Preliminary Rejection mailed Aug. 23, 2022", W/English Translation, 8 pgs.
"Korean Application Serial No. 10-2021-7035612, Response filed Oct. 27, 2022 to Notice of Preliminary Rejection mailed Aug. 23, 2022", w/ English claims, 22 pgs.
"Korean Application Serial No. 10-2023-7021390, Notice of Preliminary Rejection mailed Jan. 31, 2024", w/ English Translation, 11 pgs.
"Korean Application Serial No. 10-2023-7021390, Response filed Apr. 30, 2024 to Notice of Preliminary Rejection mailed Jan. 31, 2024", w/ English Claims, 10 pgs.
Mcclean, E, "An Augmented Reality System for Urban Environments using a Planar Building Facade Model", MS Thesis, NUI Maynooth, [Online] Retrieved from the Internet: <URL: http://search.proquest.com/docview/1535029816>, (Jan. 1, 2013), 90 pgs.
Palm, Kajsa, "Design and use of 3D typography for indoor Augmented Reality mobile applications", [Online] Retrieved from the internet: <http://www.diva-portal.Org/smash/record.jsf?dswid=-4163&pid=diva2%3A1216325>, (Jun. 12, 2018), 51 pgs.
"Chinese Application Serial No. 202080040986.9, Office Action mailed Dec. 18, 2024", w/ English translation, 13 pgs.
"Chinese Application Serial No. 202080040986.9, Response filed Apr. 18, 2025 to Office Action mailed Dec. 18, 2024", w/ English Claims, 15 pgs.
"European Application Serial No. 25206435.7, Extended European Search Report mailed Jan. 19, 2026", 5 pgs.
"Korean Application Serial No. 10-2024-7036531, Notice of Preliminary Rejection mailed Jan. 30, 2026", w/ English translation, 11 pgs.

* cited by examiner

LOCATION BASED AUGMENTED-REALITY SYSTEM

CLAIM OF PRIORITY

This application is a continuation of U.S. application Ser. No. 17/744,445, filed May 13, 2022, which application is a continuation of U.S. application Ser. No. 16/818,540, filed Mar. 13, 2020, now issued as U.S. Pat. No. 11,335,060, which application claims the benefit of priority to U.S. Provisional Application Ser. No. 62/829,571, filed on Apr. 4, 2019, which are incorporated herein by reference in their entireties.

TECHNICAL FIELD

Embodiments of the present disclosure relate generally to mobile computing technology and, more particularly, but not by way of limitation, to the presentation of augmented and virtual reality displays.

BACKGROUND

Augmented reality (AR) is a live direct or indirect view of a physical, real-world environment whose elements are supplemented, or "augmented," by a computer-generated sensory input such as sound, video, graphics, or the like. As a result, the technology functions to enhance a user's perception of reality.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
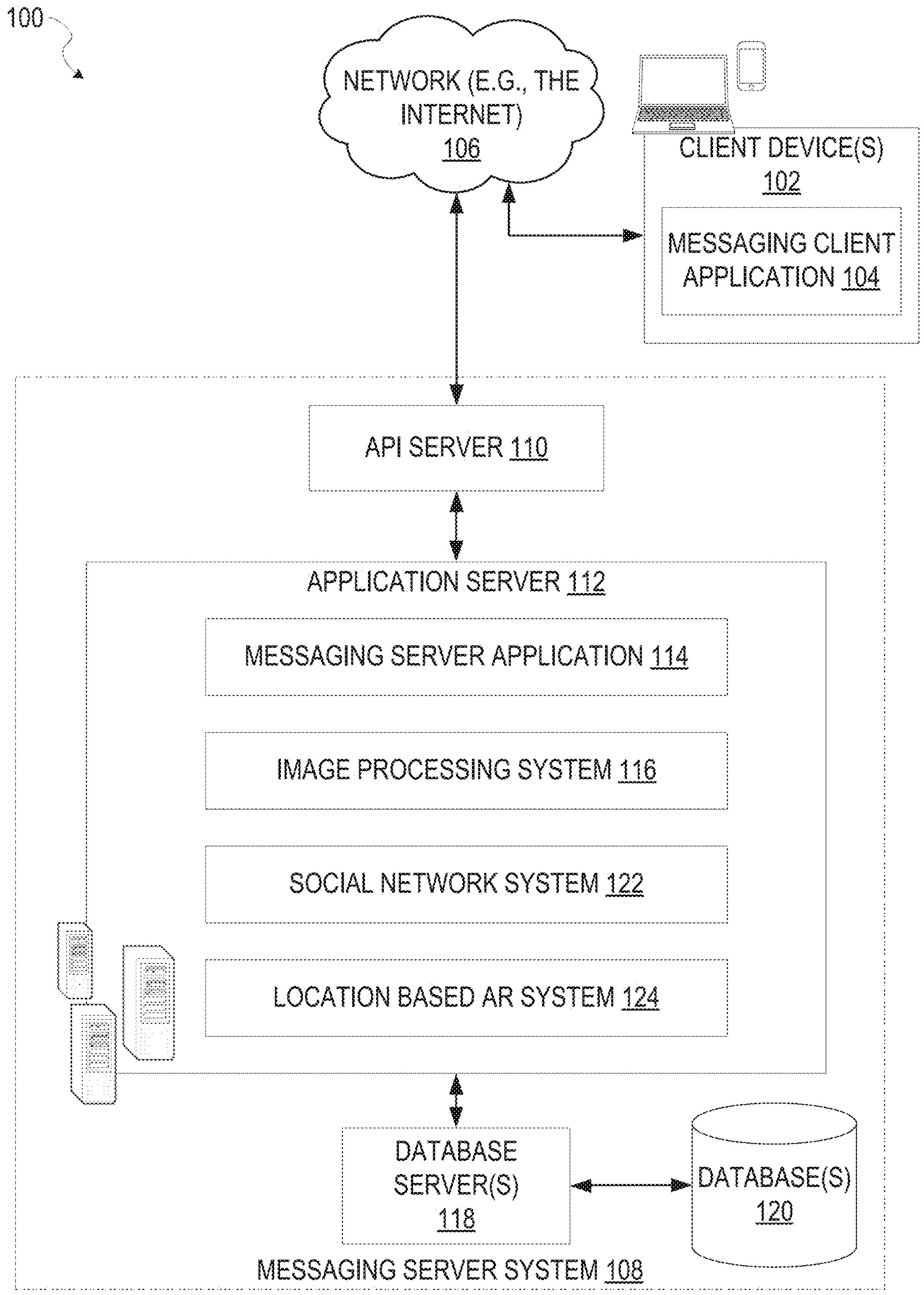
FIG. 1 is a block diagram showing an example messaging system for exchanging data (e.g., messages and associated content) over a network in accordance with some embodiments, wherein the messaging system includes a location based augmented-reality (AR) system.

As discussed above, augmented reality, or "AR," is a live direct or indirect view of a physical, real-world environment whose elements are supplemented, or "augmented," by a computer-generated sensory input such as sound, video, graphics, or the like. "AR content" therefore includes media content that comprises AR features to be presented in a presentation of a real-world environment, for example within a display of a client device. According to certain embodiments, a location-based AR system is configured to associated AR content with a location, and to access and present the AR content at a client device, in response to detecting the client device at or within the location.

In certain embodiments, the AR content includes media overlays, or "lenses," wherein a lens modifies or transforms an image or video presented at a client device in some way. For example, complex additions or transformations to the images or videos may be performed using lens data (i.e., AR content), such as adding rabbit ears to the head of a person in a video clip, adding floating hearts with background coloring to a video clip, altering the proportions of a person's features within a video clip, or many numerous other such transformations. The location-based AR content may be associated with a set of geo-location coordinates such that responsive to detecting a client device at the location, a lens associated with the location may be accessed and presented at a display of the client device.

Reference will now be made in detail to specific example embodiments for carrying out the inventive subject matter of the present disclosure. In the following description, specific details are set forth in order to provide a thorough understanding of the subject matter. It shall be appreciated that embodiments may be practiced without some or all of these specific details. Accordingly, disclosed is a location-based AR system to perform operations that include: accessing a surface model of an object or environment, wherein the surface model comprises a plurality of three-dimensional (3D) features; determining relative positions of the plurality of 3D features based on a location of a client device; determining a perspective of the client device based on the location of the client device and the relative positions of the plurality of 3D features; accessing media content associated with the location of the client device; and applying the media content to a position within a presentation of an image presented at the client device, the position based on the perspective of the client device.

In some example embodiments, the media content includes 3D typography. For example, the location-based AR system may assign a set of geo-location coordinates to the 3D typography and present the 3D typography as AR content in a presentation of an image at a client device. A text string f the 3D typography may be generated based on user input, based on user profile data associated with the client device, or in some embodiments may be predefined.

In some example embodiments presenting the media content based on a perspective of the client device may include applying one or more transformations to the media content based on the perspective, through a process of distorting, stretching, expanding, splitting, projecting, or otherwise altering the media content so as to give the impression of height, width, depth, and position relative from the viewing point (i.e., perspective) of the client device.

The location-based AR system may include a video and image capture system to record and/or present images of an environment, and a graphical interface configured to display a presentation of the environment (i.e., a display of a client device). In some example embodiments, to apply the media content to a presentation of an environment, the location-based AR system accesses a surface model associated with a location that corresponds with the environment, where the surface model is a topographical representation of the environment, or one or more objects in the environment, that includes 3D features such as surfaces, contours, and shapes. For example, the surface model may include a wire-mesh form that comprises a 3D representation of a form of the environment or objects within the environment.

In some embodiments, the location-based AR system may generate the surface model based on image data received from the client device. In such embodiments, to generate the surface model, the location-based AR system applies various computer vision techniques to the image data.

In further embodiments, the location-based AR system accesses a surface model database that includes surface models of environments, organized based on geo-location coordinates of corresponding locations depicted by the surface models. For example, the location-based AR system determines a location of a client device and retrieves or otherwise accesses the corresponding surface model from the surface model database based on the location.

The location-based AR system identifies a set of features represented by the surface mode to determine a perspective of the client device. The set of features may include distinguishing points or features such as contours in the space, markings, or other features that may be used as graphical markers. For example, the distinguishing points or features may include landmarks as well as identifiable objects such as windows and/or doors. Having identified the set of features of the surface model, the location-based AR system determines relative positions of each of the distinguishing points or features relative to one another. For example, the relative positions may indicate distances between the distinguishing points or features. The location-based AR system determines a perspective of the client device based on the relative positions of the distinguishing points or features, wherein the perspective indicates a representation of the space relative to the mobile device.

Consider an illustrative example from a user perspective. A user of a client device may cause display of image data generated by a camera associated with the client device. The location-based AR system may receive a request from the client device, where the request includes location data identifying a location of the client device. The location-based AR system may then access a media repository to access AR content that includes 3D typography, wherein the AR content is associated with the location.

To present the AR content at the client device, the location-based AR system accesses a surface model that represents one or more surfaces of the environment and determines a perspective of the client device based on 3D features of the surface model and the location of the client device. The AR content may then be applied to the image based on the perspective of the client device. From the user's perspective, the presentation of the image data may include a display of image data that depicts an area, such as a street or downtown area that comprises one or more buildings, where each of the buildings may be associated with a corresponding surface model generated by the location-based AR system. The user may then be presented with 3D typography such that it appears as though the 3D typography is floating around the surfaces of the buildings. The user may then provide an input to edit or change a text string of the 3D typography, or in some embodiments, the location-based AR system may modify or edit one or more properties of the 3D typography based on user profile data associated with the user of the client device.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server(s) 118, which facilitates access to a database(s) 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a location-based AR system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database(s) 120. Examples of functions and services supported by the social network system 122 include the identification of other users of the messaging system 100 with which a particular user has relationships or is "following," and also the identification of other entities and interests of a particular user. The location-based AR system 124 provides functionality to generate and cause display of anamorphic media within a presentation of a space.

The application server 112 is communicatively coupled to one or more database server(s) 118, which facilitates access to a database(s) 120 in which is stored data associated with messages processed by the messaging server application 114.

Figure 2:
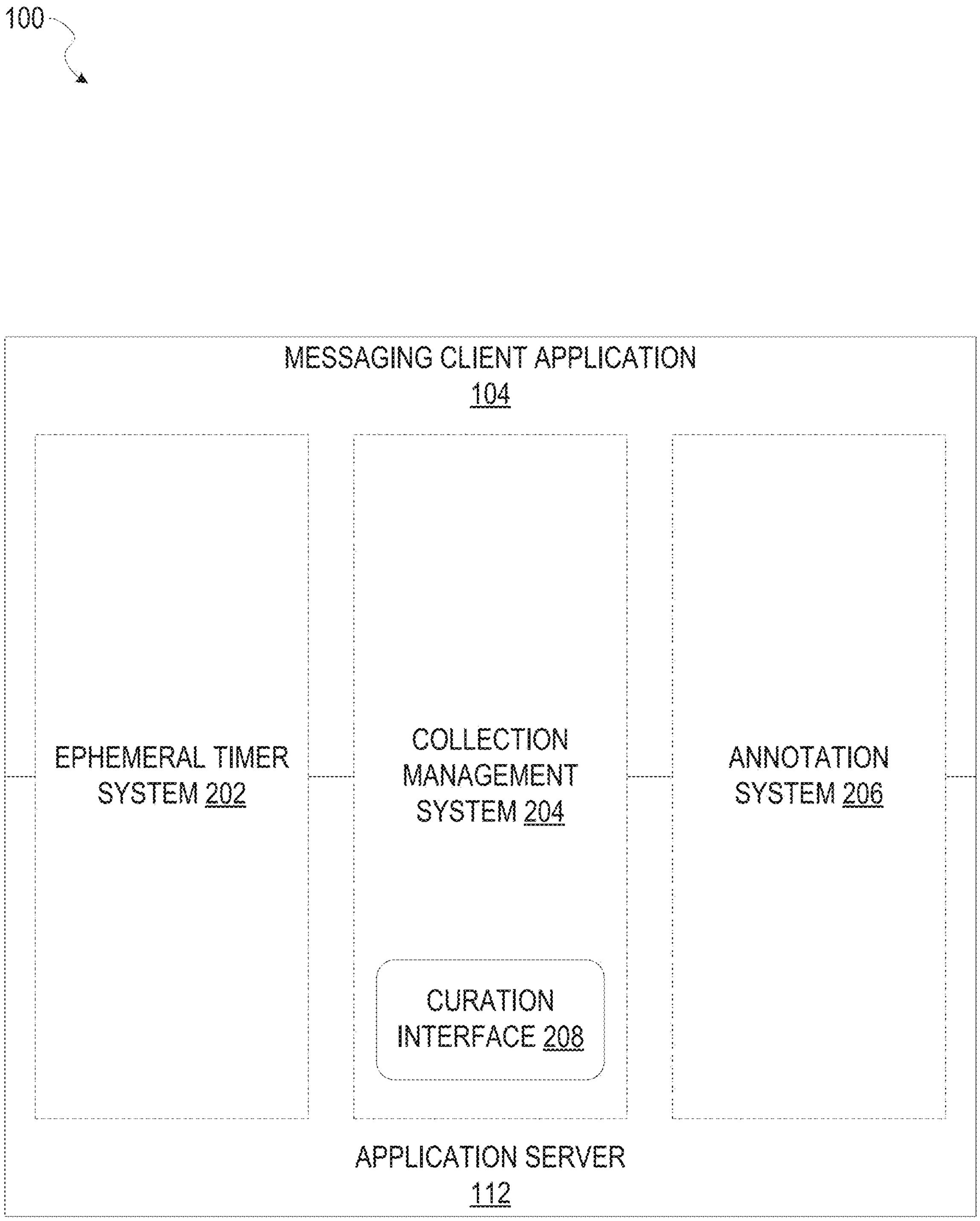
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, or collection of messages (e.g., a SNAPCHAT story), selectively display and enable access to messages and associated content such as anamorphic media via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including anamorphic media, images, video, text and audio) may be organized into an "event gallery" or an "event story." Such a collection may be made available for a specified time period, such as the duration of an event to which the content relates. For example, content such as anamorphic media displayed at specific locations relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include anamorphic media, pictures, texts, logos, animations, and sound effects. An example of a visual effect includes color overlaying, or projecting an anamorphic media item over a presentation depicting a space. The audio and visual content or the visual effects can be applied to a media content item (e.g., a photo) at the client device 102. For example, the media overlay including text that can be overlaid on top of a photograph or video stream generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database(s) 120 and accessed through the database server(s) 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
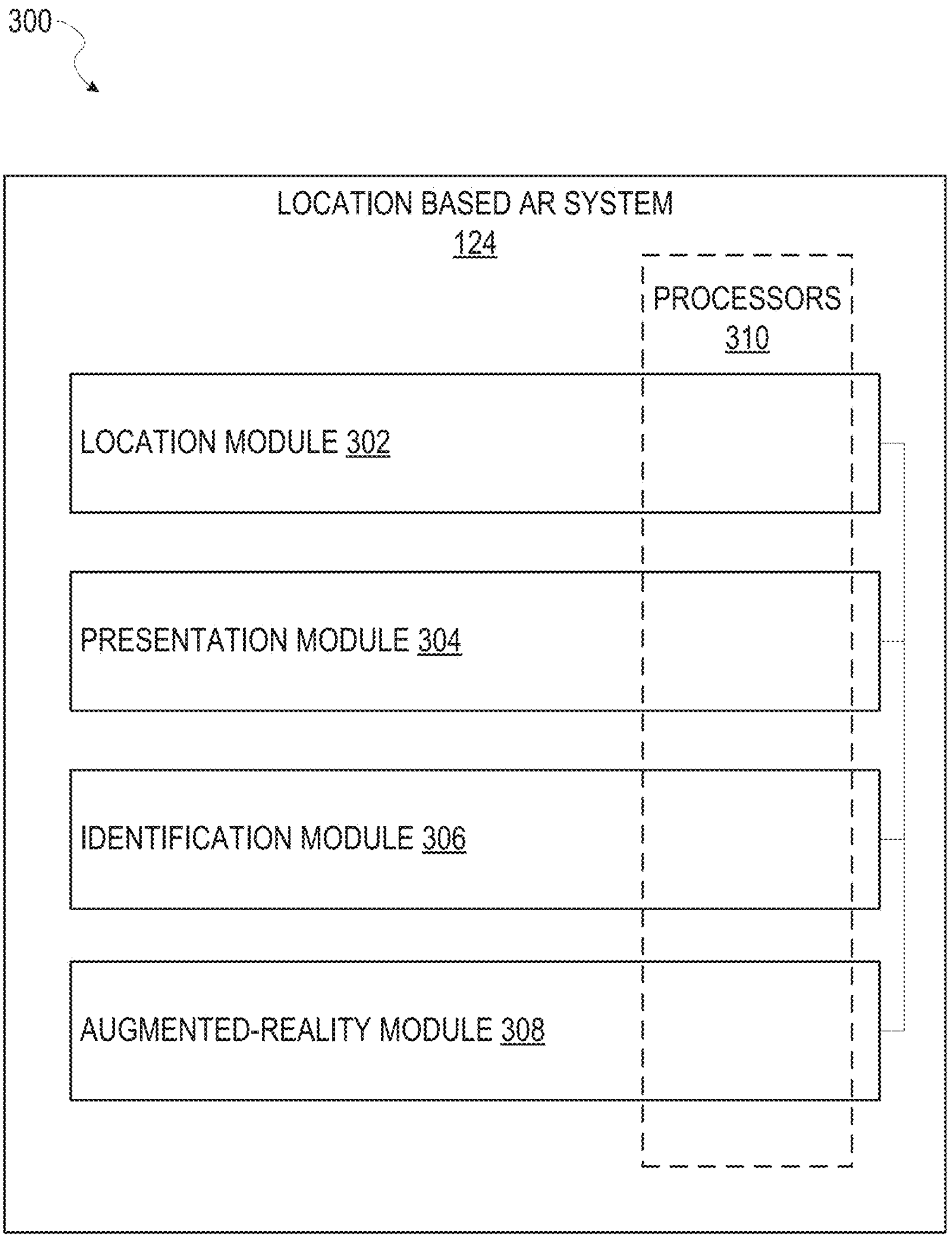
FIG. 3 is a block diagram illustrating various modules of a location-based AR system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram 300 illustrating components of the location-based AR system 124, that configure the location-based AR system 124 to present AR content that includes 3D typography based on a location and perspective of a client device, according to various example embodiments. The location-based AR system 124 is shown as including a location module 302, a presentation module 304, an identification module 306, and an AR module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the location-based AR system 124 may physically include an arrangement of one or more of the processors 310 (e.g., a subset of or among the one or more processors of the machine) configured to perform the operations described herein for that module. As another example, any module of the engagement tracking system 310 may include software, hardware, or both, that configure an arrangement of one or more processors 310 (e.g., among the one or more processors of the machine) to perform the operations described herein for that module. Accordingly, different modules of the location-based AR system 124 may include and configure different arrangements of such processors 310 or a single arrangement of such processors 310 at different points in time. Moreover, any two or more modules of the location-based AR system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
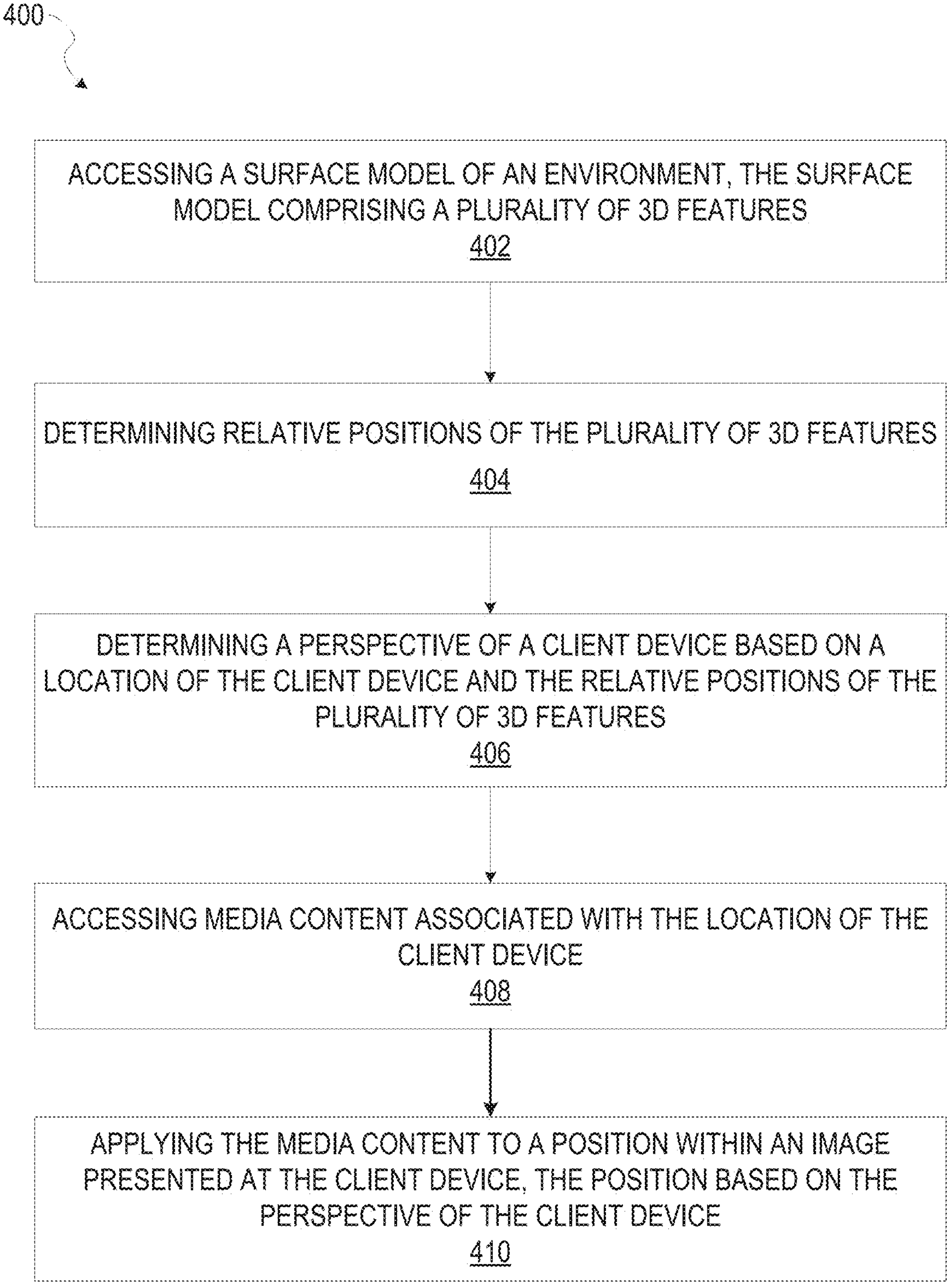
FIG. 4 is a flowchart illustrating a method of generating and causing display of location-based AR content, according to certain example embodiments.

FIG. 4 is a flowchart illustrating various operations of the location-based AR system 124 in performing a method 400 for generating and causing display of AR content at a client device, according to certain example embodiments. Operations of the method 400 may be performed by the modules described above with respect to FIG. 3. As shown in FIG. 4, the method 700 includes one or more operations 402, 404, 406, 408, and 410.

At operation 402, the location module 302 accesses a surface model of an environment, wherein the surface model comprises a plurality of 3D features. In some embodiments, to access the surface model of the environment, the location module 302 may access a repository that comprises a collection of surface models associated with locations or landmarks, wherein the collection of surface models includes a surface model associated with the environment referenced above.

For example, the location module 302 may determine a location of a client device 102 based on location data generated by the client device 102, or by identifying one or more landmarks in image data generated and displayed at the client device 102. Responsive to determining the location of the client device 102, the location module 302 may access a repository (i.e., the databases 120) to retrieve a surface model that corresponds with the environment of the location. Accordingly, the surface model may include a topographical representation of an environment, or one or more objects in the environment, that includes 3D features such as surfaces, contours, and shapes. For example, the surface model may include a wire-mesh form that comprises a 3D representation of a form of the environment or objects within the environment.

At operation 404, the identification module 306 determines relative positions of the plurality of 3D features. In some embodiments, the identification module 306 may identify a set of features depicted by the surface model of the environment that may include distinguishing points or features such as contours in the space, markings, or other features that may be used as graphical markers. In such embodiments, having identified the set of features of the surface model, the identification module 306 determines relative positions of each of the distinguishing points or features relative to one another, wherein, the relative positions indicate distances between the distinguishing points or features.

At operation 406, the AR module 308 determines a perspective of a client device 102 based on a location of the client device 102 and the relative positions of the plurality of 3D features, wherein the perspective represents a viewing position of the client device 102.

At operation 408, the AR module 308 accesses media content associated with the location at the client device 102. In some embodiments, a media repository (i.e., the databases 120) may contain a collection of media content, wherein the collection of media content is indexed within the repository based on locations, landmarks, or location attributes. Accordingly, by referencing a particular location identifier, landmark, or location attribute, the AR module 308 may identify corresponding media content.

"Locations" may include actual geographical locations which may be identified based on coordinates, as well as types of locations, like businesses (i.e., restaurant, coffee shop), specific businesses (i.e., SNAP HQ), or places (i.e., park, beach). Attributes of the locations may include weather conditions (i.e., overcast, sunny), how crowded an environment is, temperature, and time of day.

At operation 410, the presentation module 304 applies the media content to a position within an image presented at the client device 102, wherein the position is based on the perspective of the client device 102. In some embodiments, presenting the media content based on the perspective of the client device 102 may include applying one or more transformations to the media content based on the perspective, through a process of distorting, stretching, expanding, splitting, projecting, or otherwise altering the media content so as to give the impression of height, width, depth, and position relative from the viewing point (i.e., perspective) of the client device 102.

Figure 5:
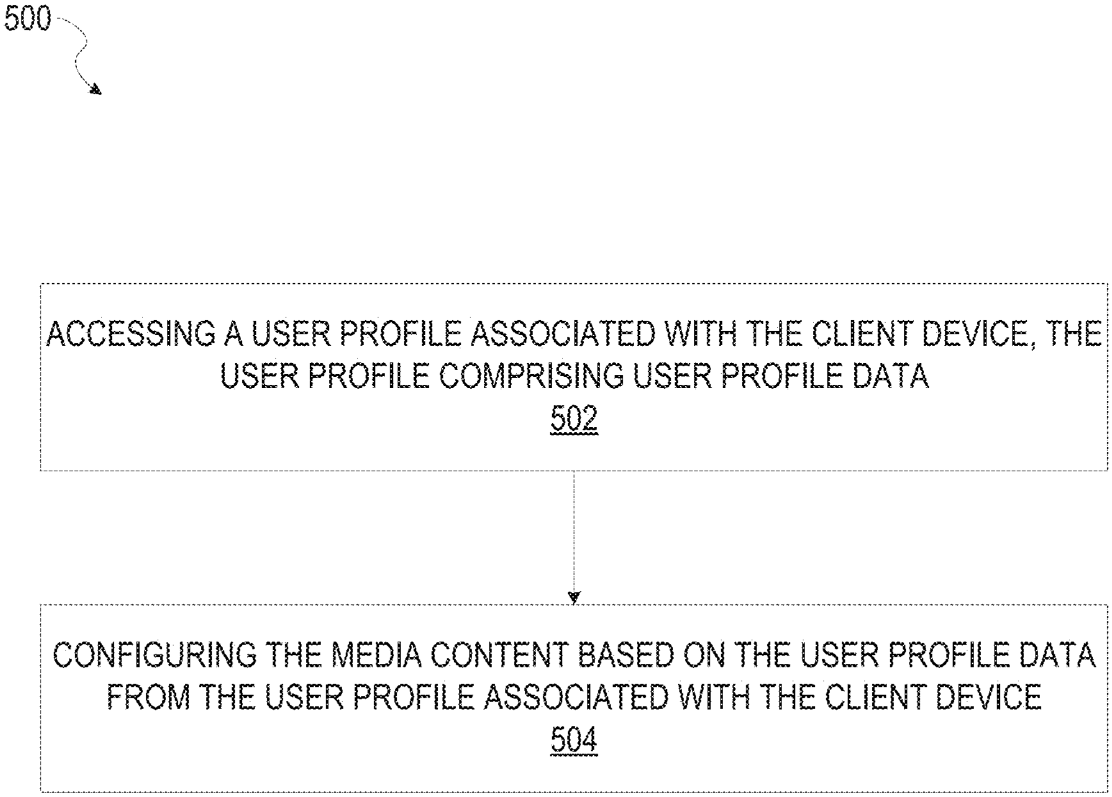
FIG. 5 is a flowchart illustrating a method of generating and causing display of location-based AR content, according to certain example embodiments.

FIG. 5 is a flowchart illustrating various operations of the location-based AR system 124 in performing a method 500 for generating and causing display of AR content at a client device, according to certain example embodiments. Operations of the method 500 may be performed by the modules described above with respect to FIG. 3. As shown in FIG. 5, the method 500 includes one or more operations 502, and 504 that may be performed as part (e.g., a precursor task, a subroutine, or a portion) of the method 400, according to some example embodiments.

At operation 502, the presentation module 304 accesses a user profile associated with the client device 102, wherein the user profile comprises user profile data. In some embodiments, responsive to detecting a client device associated with the user (i.e., client device 102) at a location, the presentation module 304 may access the user profile of the user to retrieve user profile data.

According to certain example embodiments, the user profile data may include user selections defining affinities and interests of the user, as well as user demographics information, language preferences, a list of user connections (i.e., a buddy list), and a log of user actions performed by the user.

At operation 504, the AR module 308 configures the media content based on the user profile data from the user profile associated with the client device 102. For example, as seen in the interface diagram 804 depicted in FIG. 8, the media content 806 may include media attributes that include text features that define a word or phrase. In certain embodiments, the AR module 308 may configure the media attributes of the media content 806 based on the user profile data associated with the client device 102. By doing so, the media content 806 may appear differently to different users at their corresponding devices.

As an illustrative example, the AR module 308 may translate a text feature of the media content 806 based on a language preference associated with the user, or may select and display graphical features of the media content 806 (i.e., a color, size, shape, etc.) based on the user profile data associated with the client device 102.

In some embodiments, a location in which the media content 806 is displayed may also be determined based on the user profile data that corresponds with the client device 102. For example, a user of the client device 102 may have corresponding user profile data that identifies one or more locations associated with the user based on explicit user inputs, or implicit user activities (i.e., frequency visiting a location over a period of time, duration spent at a location per visit, etc.), such as addresses (work, home, gym, etc.). In such embodiments, the AR module 308 may select and present the media content (i.e., media content 806) at locations based on the locations from the user profile data. As an illustrative example, responsive to identifying a home address associated with the user of the client device 102, the AR module 308 may present media content at a position based on the user's the home address.

Figure 6:
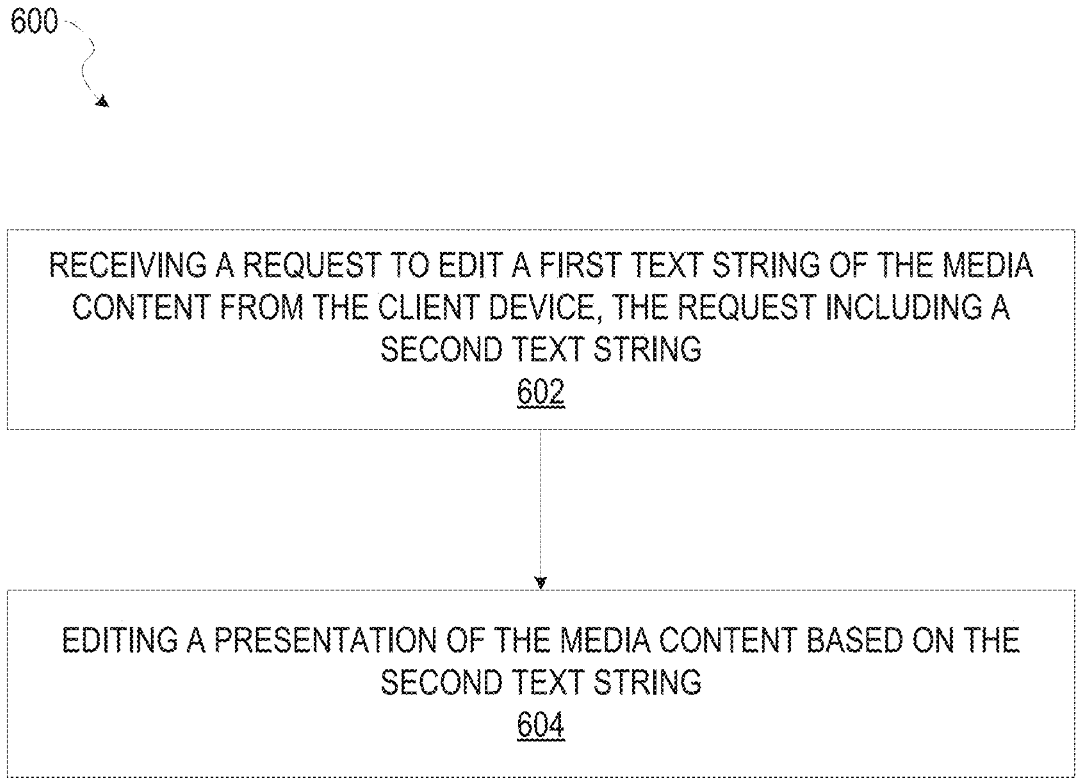
FIG. 6 is a flowchart illustrating a method for generating and causing display of location-based AR content, according to certain example embodiments.

FIG. 6 is a flowchart illustrating various operations of the location-based AR system 124 in performing a method 600 for generating and causing display of AR content at a client device, according to certain example embodiments. Operations of the method 600 may be performed by the modules described above with respect to FIG. 3. As shown in FIG. 6, the method 600 includes one or more operations 602, and 604 that may be performed as part (e.g., a precursor task, a subroutine, or a portion) of the method 400, according to some example embodiments.

At operation 602, the AR module 308 receives a request to edit a feature of media content from a client device 102, wherein the feature includes a first text string, and the request includes a second text string. For example, a user may configure features of the media content by providing an input that selects a display of the media content at the client device 102. Responsive to the input, the presentation module 304 may cause display of an interface to receive inputs to edit the features of the selected media content.

At operation 604, the AR module 308 edits a presentation of the media content at the client device based on the second request included in the request. As an illustrative example, a user of the client device 102 may provide an input selecting media content, such as the media content 806 from the interface diagram 804 depicted in FIG. 8. The user of the client device 102 may thereby provide an input that includes a second text string. The AR module 308 may then alter the presentation of the media content 806 based on the second text string from the request.

Figure 7:
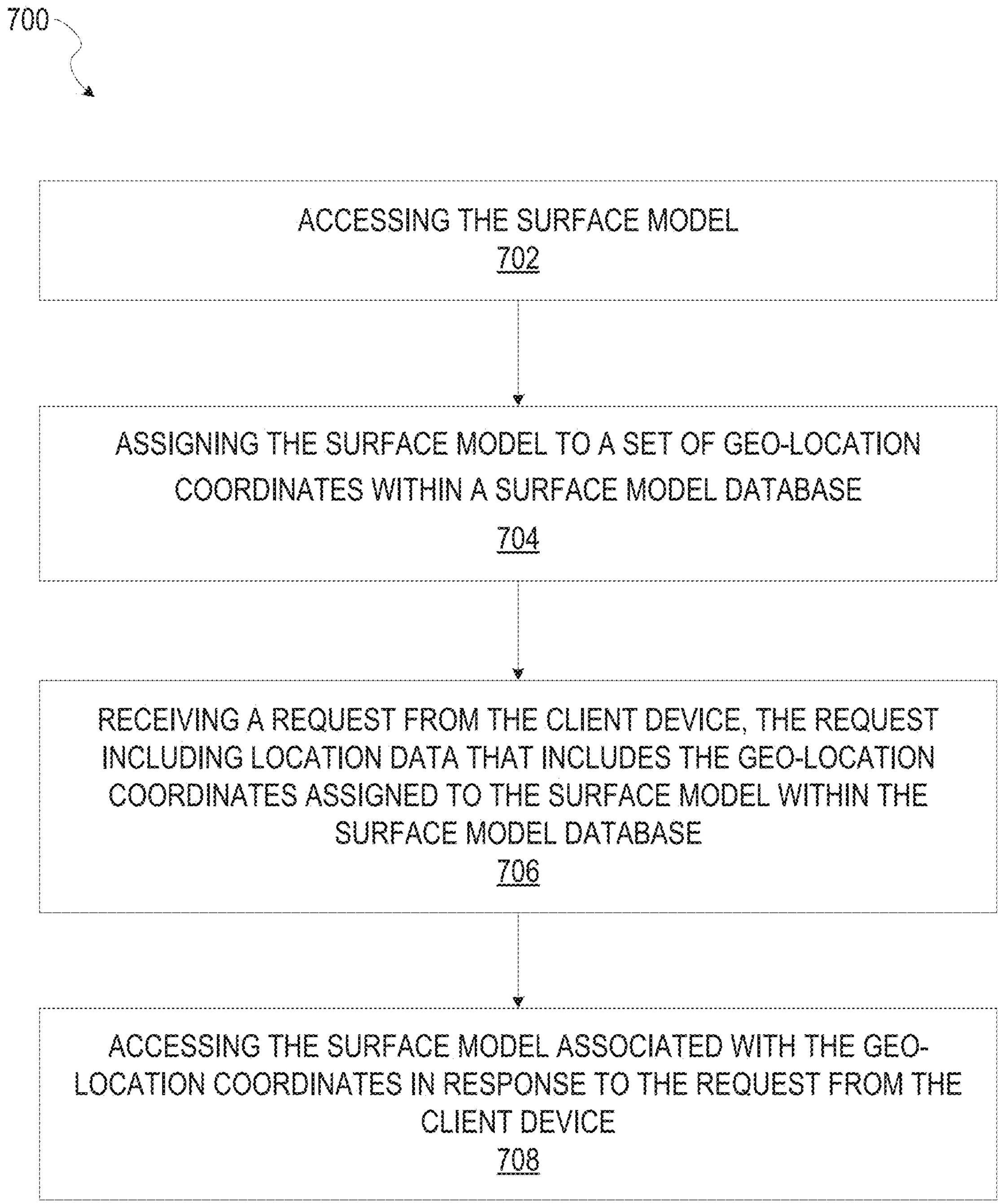
FIG. 7 is a flowchart illustrating a method for generating and causing display of location-based AR content, according to certain example embodiments.

FIG. 7 is a flowchart illustrating various operations of the location-based AR system 124 in performing a method 700 for generating and causing display of AR content at a client device, according to certain example embodiments. Operations of the method 700 may be performed by the modules described above with respect to FIG. 3. As shown in FIG. 7, the method 700 includes one or more operations 7-2, 704, 706, and 708 that may be performed as part (e.g., a precursor task, a subroutine, or a portion) of the method 400, according to some example embodiments.

At operation 702, the AR module 308 accesses a surface model. As discussed above, a surface model is a topographical representation of an environment, or one or more objects in the environment, that includes 3D features such as surfaces, contours, and shapes. For example, the surface model may include a wire-mesh form that comprises a 3D representation of a form of the environment or objects within the environment.

In some embodiments accessing the surface model may include generating the surface model. For example, the AR module 308 may generate the surface model based on image data received from the client device. In such embodiments, to generate the surface model, the AR module 308 applies various computer vision techniques to the image data to identify surface features and generates the surface model based on the surface features.

At operation 704, the location module 302 assigns the surface model generated by the AR module 308 to a location based on one or more of the surface features that correspond with location, and geo-location coordinates associated with the location. In some embodiments, the location module 302 may index the surface model within a surface model database (i.e., the databases 120), wherein the surface model database includes a plurality of surface models assigned to location.

In such embodiments, by referencing a location based on a set of surface features, or geo-location coordinates, a corresponding surface model may be identified.

At operation 706, as in operation 402 of the method 400 depicted in FIG. 4, the AR module 308 receives a request form the client device 102, wherein the request includes location information (i.e., a set of surface features, geolocation coordinates). For example, the location information may identify a current location of the client device 102.

Responsive to receiving the request that includes the location information, at operation 708 the AR module 308 accesses the surface model associated with the location information within the database 120. Accordingly, the AR module 308 may then render and display media content within a presentation of image data based on the surface model that corresponds with the location.

Figure 8:
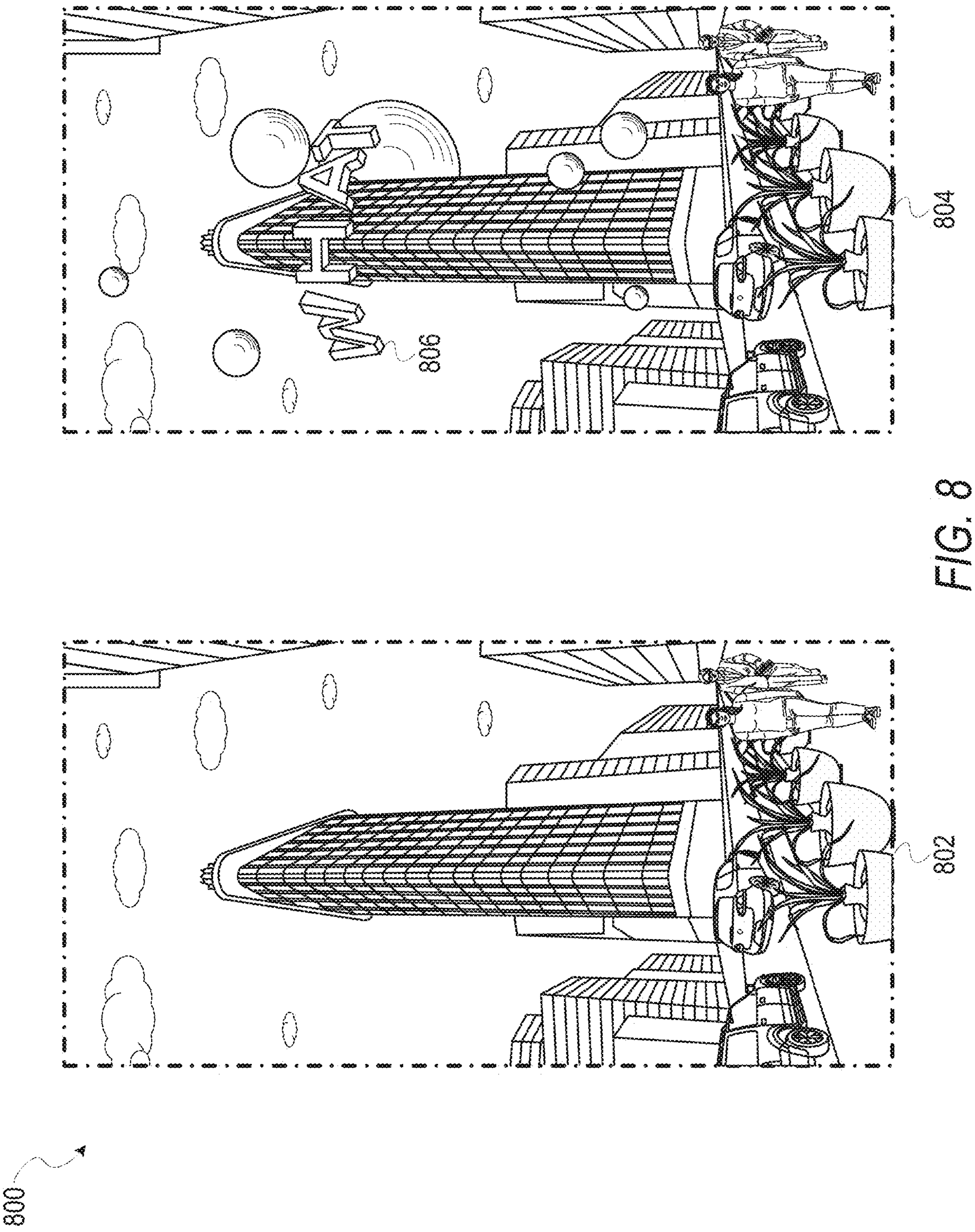
FIG. 8 is an interface flow-diagram illustrating a presentation of location-based AR content, according to certain example embodiments.

FIG. 8 is an interface flow-diagram illustrating a presentation of location-based AR content presented by the location-based AR system 124, according to certain example embodiments. As seen in FIG. 8, the interface flow diagram includes an interface diagram 802, and an interface diagram 804.

According to certain example embodiments, a client device 102 may cause display of a presentation of the interface diagram 802. For example, the client device 102 may capture image data and generate the interface depicted by the interface diagram 802. As discussed in the method 400 depicted in FIG. 4, and the method 700 depicted in FIG. 7, the modules of the location based AR system 124 may access a surface model associated with a location depicted in the interface diagram 802, based on surface features from an image, or based on location data accessed at the client device 102.

As seen in the interface diagram 804, the location based AR system 124 may access media content within a repository (i.e., the databases 120) based on the location of the client device 102. The media content (i.e., the media content 806) may be associated with the location within a media repository, such that reference to the location within the repository may identify the media content 806.

The location based AR system 124 may then cause display of a presentation of the media content 806 at a position within a GUI, as seen in the interface diagram 804.

Software Architecture

Figure 9:
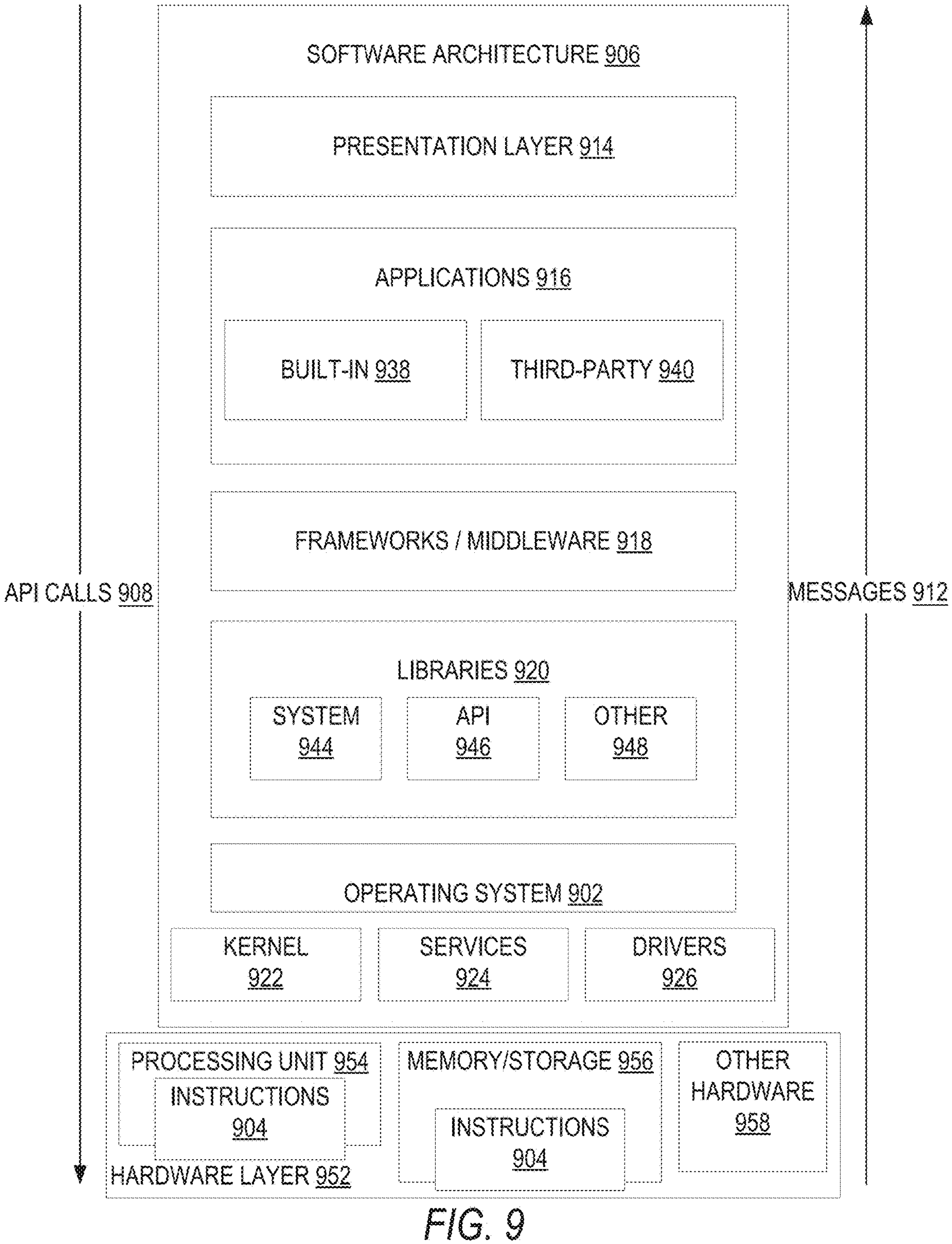
FIG. 9 is a block diagram illustrating a representative software architecture, which may be used in conjunction with various hardware architectures herein described and used to implement various embodiments.

FIG. 9 is a block diagram illustrating an example software architecture 906, which may be used in conjunction with various hardware architectures herein described. FIG. 9 is a non-limiting example of a software architecture and it will be appreciated that many other architectures may be implemented to facilitate the functionality described herein. The software architecture 906 may execute on hardware such as machine 1000 of FIG. 10 that includes, among other things, processors 1004, memory 1014, and I/O components 1018. A representative hardware layer 952 is illustrated and can represent, for example, the machine 1000 of FIG. 10. The representative hardware layer 952 includes a processing unit 954 having associated executable instructions 904. Executable instructions 904 represent the executable instructions of the software architecture 906, including implementation of the methods, components and so forth described herein. The hardware layer 952 also includes memory and/or storage modules memory/storage 956, which also have executable instructions 904. The hardware layer 952 may also comprise other hardware 958.

In the example architecture of FIG. 9, the software architecture 906 may be conceptualized as a stack of layers where each layer provides particular functionality. For example, the software architecture 906 may include layers such as an operating system 902, libraries 920, applications 916 and a presentation layer 914. Operationally, the applications 916 and/or other components within the layers may invoke application programming interface (API) API calls 908 through the software stack and receive a response as in response to the API calls 908. The layers illustrated are representative in nature and not all software architectures have all layers. For example, some mobile or special purpose operating systems may not provide a frameworks/middleware 918, while others may provide such a layer. Other software architectures may include additional or different layers.

The operating system 902 may manage hardware resources and provide common services. The operating system 902 may include, for example, a kernel 922, services 924 and drivers 926. The kernel 922 may act as an abstraction layer between the hardware and the other software layers. For example, the kernel 922 may be responsible for memory management, processor management (e.g., scheduling), component management, networking, security settings, and so on. The services 924 may provide other common services for the other software layers. The drivers 926 are responsible for controlling or interfacing with the underlying hardware. For instance, the drivers 926 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 920 provide a common infrastructure that is used by the applications 916 and/or other components and/or layers. The libraries 920 provide functionality that allows other software components to perform tasks in an easier fashion than to interface directly with the underlying operating system 902 functionality (e.g., kernel 922, services 924 and/or drivers 926). The libraries 920 may include system libraries 944 (e.g., C standard library) that may provide functions such as memory allocation functions, string manipulation functions, mathematical functions, and the like. In addition, the libraries 920 may include API libraries 946 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 920 may also include a wide variety of other libraries 948 to provide many other APIs to the applications 916 and other software components/modules.

The frameworks/middleware 918 (also sometimes referred to as middleware) provide a higher-level common infrastructure that may be used by the applications 916 and/or other software components/modules. For example, the frameworks/middleware 918 may provide various graphic user interface (GUI) functions, high-level resource management, high-level location services, and so forth. The frameworks/middleware 918 may provide a broad spectrum of other APIs that may be utilized by the applications 916 and/or other software components/modules, some of which may be specific to a particular operating system 902 or platform.

The applications 916 include built-in applications 938 and/or third-party applications 940. Examples of representative built-in applications 938 may include, but are not limited to, a contacts application, a browser application, a book reader application, a location application, a media application, a messaging application, and/or a game application. Third-party applications 940 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 940 may invoke the API calls 908 provided by the mobile operating system (such as operating system 902) to facilitate functionality described herein.

The applications 916 may use built in operating system functions (e.g., kernel 922, services 924 and/or drivers 926), libraries 920, and frameworks/middleware 918 to create user interfaces to interact with users of the system. Alternatively, or additionally, in some systems interactions with a user may occur through a presentation layer, such as presentation layer 914. In these systems, the application/component "logic" can be separated from the aspects of the application/component that interact with a user.

Figure 10:
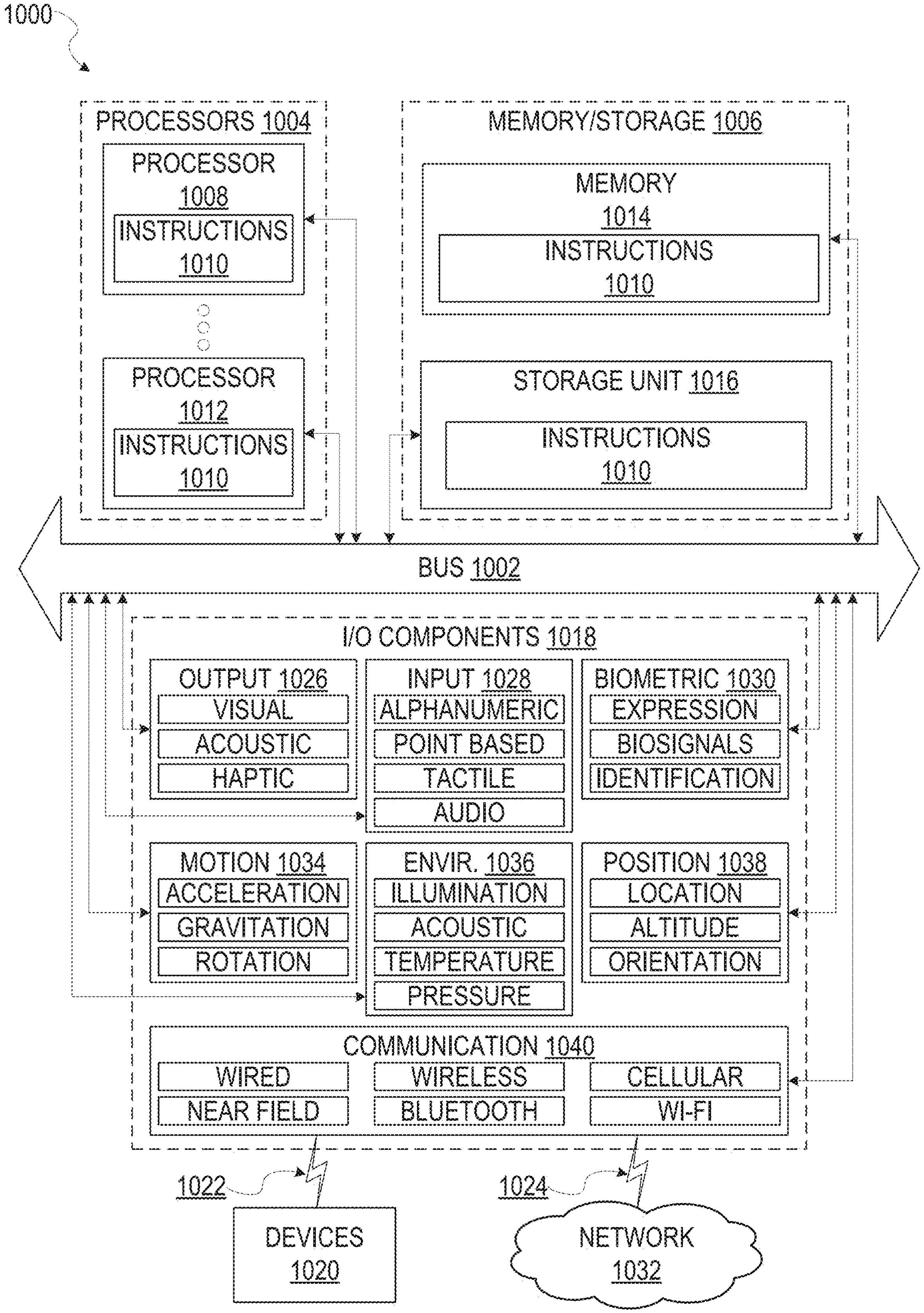
FIG. 10 is a block diagram illustrating components of a machine, according to some example embodiments, able to read instructions from a machine-readable medium (e.g., a machine-readable storage medium) and perform any one or more of the methodologies discussed herein.

FIG. 10 is a block diagram illustrating components of a machine 1000, according to some example embodiments, able to read instructions from a machine-readable medium (e.g., a machine-readable storage medium) and perform any one or more of the methodologies discussed herein. Specifically, FIG. 10 shows a diagrammatic representation of the machine 1000 in the example form of a computer system, within which instructions 1010 (e.g., software, a program, an application, an applet, an app, or other executable code) for causing the machine 1000 to perform any one or more of the methodologies discussed herein may be executed. As such, the instructions 1010 may be used to implement modules or components described herein. The instructions 1010 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1010, sequentially or otherwise, that specify actions to be taken by machine 1000. Further, while only a single machine 1000 is illustrated, the term "machine" shall also be taken to include a collection of machines that individually or jointly execute the instructions 1010 to perform any one or more of the methodologies discussed herein.

The machine 1000 may include processors 1004, memory memory/storage 1006, and I/O components 1018, which may be configured to communicate with each other such as via a bus 1002. The memory/storage 1006 may include a memory 1014, such as a main memory, or other memory storage, and a storage unit 1016, both accessible to the processors 1004 such as via the bus 1002. The storage unit 1016 and memory 1014 store the instructions 1010 embodying any one or more of the methodologies or functions described herein. The instructions 1010 may also reside, completely or partially, within the memory 1014, within the storage unit 1016, within at least one of the processors 1004 (e.g., within the processor's cache memory), or any suitable combination thereof, during execution thereof by the machine 1000. Accordingly, the memory 1014, the storage unit 1016, and the memory of processors 1004 are examples of machine-readable media.

The I/O components 1018 may include a wide variety of components to receive input, provide output, produce output, transmit information, exchange information, capture measurements, and so on. The specific I/O components 1018 that are included in a particular machine 1000 will depend on the type of machine. For example, portable machines such as mobile phones will likely include a touch input device or other such input mechanisms, while a headless server machine will likely not include such a touch input device. It will be appreciated that the I/O components 1018 may include many other components that are not shown in FIG. 10. The I/O components 1018 are grouped according to functionality merely for simplifying the following discussion and the grouping is in no way limiting. In various example embodiments, the I/O components 1018 may include output components 1026 and input components 1028. The output components 1026 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1028 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1018 may include biometric components 1030, motion components 1034, environmental environment components 1036, or position components 1038 among a wide array of other components. For example, the biometric components 1030 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1034 may include acceleration sensor components (e.g., accelerometer), gravitation sensor components, rotation sensor components (e.g., gyroscope), and so forth. The environment components 1036 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1038 may include location sensor components (e.g., a Global Position system (GPS)

receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1018 may include communication components 1040 operable to couple the machine 1000 to a network 1032 or devices 1020 via coupling 1022 and coupling 1024 respectively. For example, the communication components 1040 may include a network interface component or other suitable device to interface with the network 1032. In further examples, communication components 1040 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1020 may be another machine or any of a wide variety of peripheral devices (e.g., a peripheral device coupled via a Universal Serial Bus (USB)).

Moreover, the communication components 1040 may detect identifiers or include components operable to detect identifiers. For example, the communication components 1040 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1040, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A system comprising:

a memory; and at least one hardware processor couple to the memory and comprising instructions that cause the system to perform operations comprising:

detecting a client device at a location;

accessing user profile data associated with a user of the client device responsive to detecting the client device at the location;

generating media content associated with the location based on the user profile data;

determining a perspective of the client device relative to the location based on one or more features associated with the location; and causing display of a presentation of the media content at the client device based on the attributes associated with the location and the perspective.

2. The system of claim 1, wherein the user profile data includes a language preference, and wherein the generating the media content based on the user profile data further comprises:

generating the media content based on the language preference.

3. The system of claim 1, wherein the operations further comprise:

generating a surface model of the location based on image data received from the client device, and wherein the one or more features associated with the location are identified from the surface model.

4. The system of claim 1, wherein the one or more features associated with the location include at least one of a contour, a marking, a landmark, a door, or a window at the location.

5. The system of claim 1, wherein the media content comprises a text string, and the configuring the media content based on the user profile data further comprises:

generating the text string based on the user profile data.

6. The system of claim 1, wherein the configuring the media content further comprises:

accessing the media content based on the location.

7. The system of claim 1, further comprising:

receiving from the client device, an input that defines an update to a property of the media content; and storing the update to the property of the media content within a database.

8. A method comprising:

detecting a client device at a location;

accessing user profile data associated with a user of the client device responsive to detecting the client device at the location;

generating media content associated with the location based on the user profile data;

determining a perspective of the client device relative to the location based on one or more features associated with the location; and causing display of a presentation of the media content at the client device based on the attributes associated with the location and the perspective.

9. The method of claim 8, wherein the user profile data includes a language preference, and wherein the generating the media content based on the user profile data further comprises:

generating the media content based on the language preference.

10. The method of claim 8, wherein the operations further comprise:

generating a surface model of the location based on image data received from the client device, and wherein the one or more features associated with the location are identified from the surface model.

11. The method of claim 8, wherein the one or more features associated with the location include at least one of a contour, a marking, a landmark, a door, or a window at the location.

12. The method of claim 8, wherein the media content comprises a text string, and the configuring the media content based on the user profile data further comprises:

generating the text string based on the user profile data.

13. The method of claim 8, wherein the configuring the media content further comprises:

accessing the media content based on the location.

14. The method of claim 8, further comprising:

receiving from the client device, an input that defines an update to a property of the media content; and storing the update to the property of the media content within a database.

15. A non-transitory machine-readable storage medium comprising instructions that, when executed by one or more processors of a machine, cause the machine to perform operations comprising:

detecting a client device at a location;

accessing user profile data associated with a user of the client device responsive to detecting the client device at the location;

generating media content associated with the location based on the user profile data;

determining a perspective of the client device relative to the location based on one or more features associated with the location; and causing display of a presentation of the media content at the client device based on the attributes associated with the location and the perspective.

16. The non-transitory machine-readable storage medium of claim 15, wherein the user profile data includes a language preference, and wherein the generating the media content based on the user profile data further comprises:

generating the media content based on the language preference.

17. The non-transitory machine-readable storage medium of claim 15, wherein the operations further comprise:

generating a surface model of the location based on image data received from the client device, and wherein the one or more features associated with the location are identified from the surface model.

18. The non-transitory machine-readable storage medium of claim 15, wherein the one or more features associated with the location include at least one of a contour, a marking, a landmark, a door, or a window at the location.

19. The non-transitory machine-readable storage medium of claim 15, wherein the media content comprises a text string, and the configuring the media content based on the user profile data further comprises:

generating the text string based on the user profile data.

20. The non-transitory machine-readable storage medium of claim 15, wherein the configuring the media content further comprises:

accessing the media content based on the location.

* * * * *